United States Patent
Holtkotte

(10) Patent No.: US 6,584,755 B2
(45) Date of Patent: Jul. 1, 2003

(54) APPARATUS FOR ADJUSTING THE SPACING AND/OR THE CONTACT PRESSURE BETWEEN TWO ROLLERS OF A KERNEL PROCESSOR

(75) Inventor: Eberhard Holtkotte, Zweibrücken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/929,842

(22) Filed: Aug. 14, 2001

(65) Prior Publication Data

US 2003/0033792 A1 Feb. 20, 2003

(51) Int. Cl.⁷ ............................................. A01D 45/02
(52) U.S. Cl. ............................. 56/10.2 B; 56/10.2 R; 56/60
(58) Field of Search ................. 56/10.2 R, 10.2 B, 56/10.2 J, 51, 53, 60, DIG. 15; 460/1, 7, 25

(56) References Cited

U.S. PATENT DOCUMENTS

| 4,040,344 | A | * | 8/1977 | Moore et al. ............. 100/171 |
| 4,531,118 | A | * | 7/1985 | Beams ...................... 340/684 |
| 4,850,183 | A | * | 7/1989 | Fox ............................ 241/236 |
| 4,912,914 | A | * | 4/1990 | Wingard ....................... 34/113 |
| 5,033,257 | A | * | 7/1991 | Walters ....................... 100/169 |
| 5,531,062 | A | * | 7/1996 | Pfrimmer .................. 56/10.2 J |
| 5,921,071 | A | * | 7/1999 | Paquet et al. ............... 241/34 |
| 6,290,599 | B1 | * | 9/2001 | Eis et al. ..................... 460/109 |
| 6,360,515 | B1 | * | 3/2002 | Cook .......................... 56/14.1 |
| 6,389,884 | B1 | * | 5/2002 | Diekhans et al. ............. 460/7 |
| 6,397,570 | B1 | * | 6/2002 | Bohrer et al. ................. 460/2 |

FOREIGN PATENT DOCUMENTS

DE    195 39 143    4/1997

* cited by examiner

Primary Examiner—Robert E. Pezzuto
Assistant Examiner—Nathan Mammen

(57) ABSTRACT

A kernel processor includes a pair of rollers which are controlled such that the spacing between them varies inversely, or such that the contact pressure between them varies directly, in response to varying moisture content of the crop material being processed.

6 Claims, 2 Drawing Sheets

# APPARATUS FOR ADJUSTING THE SPACING AND/OR THE CONTACT PRESSURE BETWEEN TWO ROLLERS OF A KERNEL PROCESSOR

FIELD OF THE INVENTION

The invention concerns an apparatus for adjusting the spacing and/or contact pressure between two rollers of a kernel processor.

BACKGROUND OF THE INVENTION

In the current state of the technology, the rollers of a kernel processor can be positioned mechanically with a defined spacing between them. Upon the introduction of a foreign object, a roller, or both rollers, can yield along a fixed path under the force of a spring. Thus, the problem is posed of how to adjust the spacing between the rollers of the kernel processor. If a small spacing is selected, a true crushing of the grains contained in the harvested material is certainly guaranteed; however, in comparison to rollers which are adjusted to a larger spacing, the rate of feed is reduced and the energy requirement for the operation of the kernel processor device is increased. By increasing the spacing between the rollers, these disadvantages can be avoided; however, there is not an adequately assured crushing of the grains with moist harvested materials due to their relatively greater elasticity compared to dry harvested materials. Livestock that is then fed with this harvested material cannot completely digest it.

In DE 195 39 143 A, an intake device for forage harvesters is described, which is equipped with a device for the regulation of the pressure exerted on a vertically moving feed roller. The pressure operating on the harvested material which has been transported between the feed rollers is adjustable by this means. The pressure can also be controlled as a function of the throughput of the harvested material.

The problem that is the basis for the invention is how to achieve a true crushing of the kernels contained in the harvested material.

SUMMARY OF THE INVENTION

According to the present invention there is provided an improved kernel processor arrangement.

An object of the invention is to provide a kernel processor capable of effectively crushing the kernels of harvested crop of varying moisture content.

A more specific object of the invention is to provide a kernel processor having a power-adjusted processor roll, wherein the actuator is coupled in a control system that monitors the moisture content of the harvested crop and sends a corresponding signal to control the processor roll actuator.

These and other objects will become apparent from a reading of the ensuing description together with the appended drawings.

DESCRIPTION OF THE PREFERRED EMBODIMENTS

Figure 1:
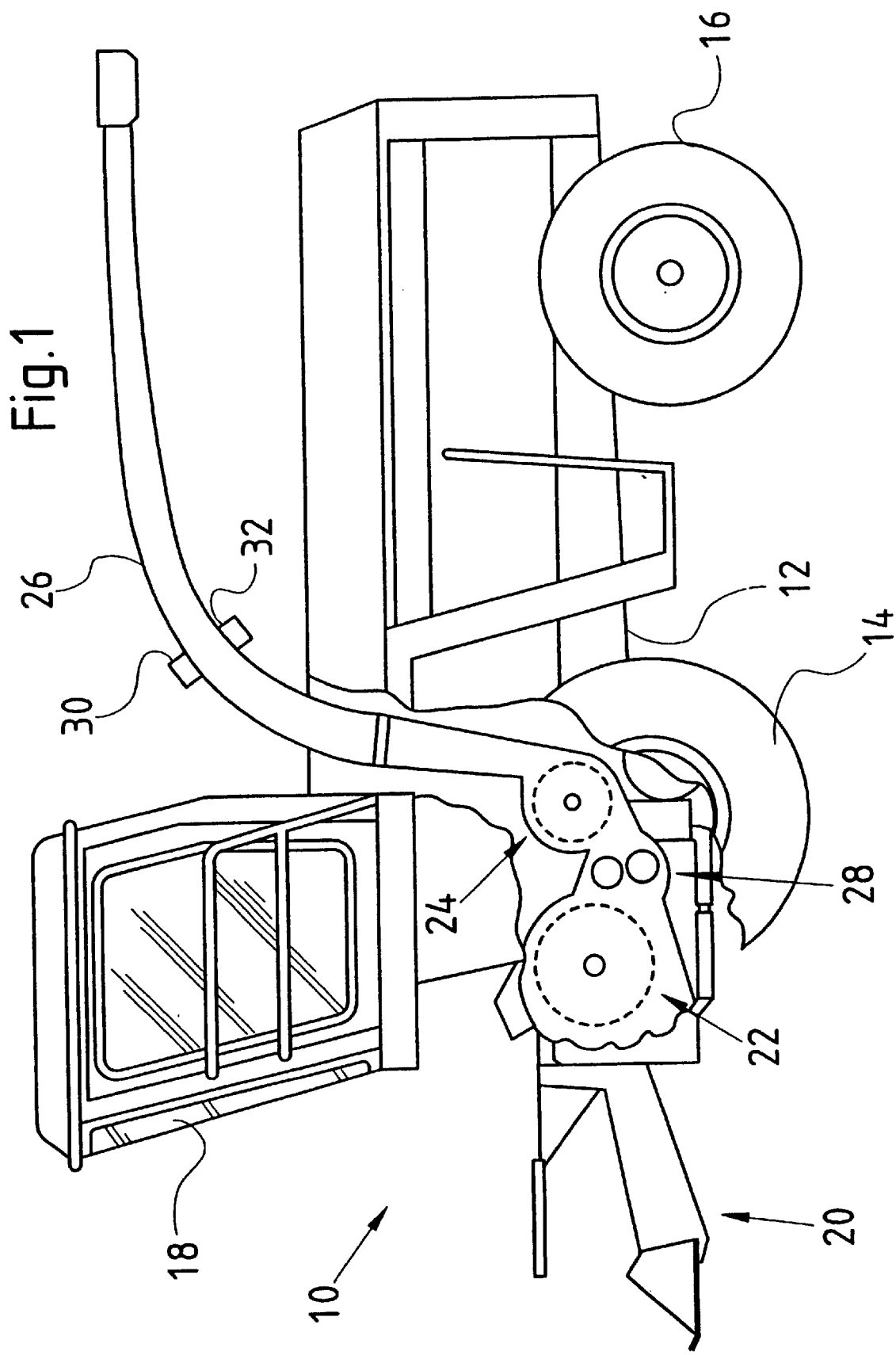
FIG. 1 is a left side schematic view of a forage harvester equipped with a kernel processor.

A harvester 10, shown in FIG. 1, is a self-propelled forage harvester including a chassis 12, which is supported by front and rear sets of wheels 14 and 16, respectively. The operation of the harvester 10 takes place from an operator's cab, from which a crop intake apparatus 20 is observable. Material taken up off the ground by the means of the crop intake apparatus 20, for example corn, grass, or the like, is fed into a chopper or cutter drum 22, which chops it into small pieces and releases it into a conveyor system 24. The material exits from the harvester 10 through a pivoting discharge spout 26 to a following trailer.

Between the chopper or cutter drum 22 and the conveyor system 24, a kernel processor with two interacting rollers 28 is installed, so as to receive the chopped material as it exits tangentially from the cutter drum 22 and is delivered tangentially to the conveyor system 24. The rollers 28 of the kernel processor are driven in opposite directions. The flow of the chopped material is passed between them. The purpose of the rollers 28 is to crush or grind the kernels, especially corn kernels, of the harvested material so that they can be digested by livestock that is fed the chopped material. The outer surfaces of the rollers 28 of the kernel processor can be smooth or profiled in the standard manner.

Figure 2:
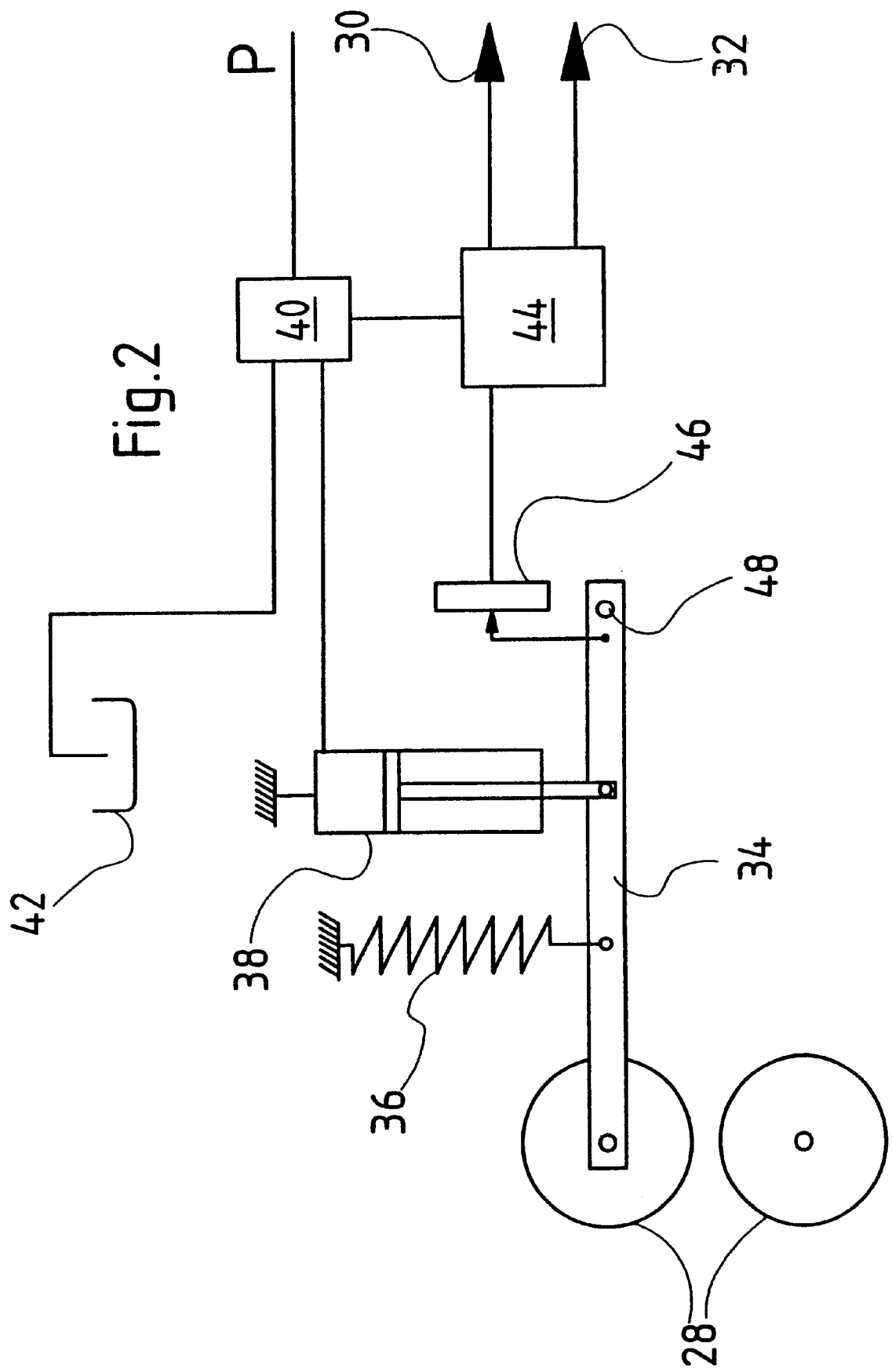
FIG. 2 is a schematic view of the system for controlling the spacing between the processor rolls.

The spacing of the rollers 28 of the kernel processor is controlled by a control device 44 (FIG. 2) as a function of the moisture of the material fed in. The underlying idea is that the kernels contained in the material are harder to grind, the moister the material is, since the grains then become more elastic. For dry material, larger spacing between the rollers is adjusted by the control device than for moist material. In this way, the increased energy requirement for the operation of the kernel processor associated with a relatively small opening can be avoided with dry material, which requirement is greater than with a large opening or a manual adjustment of the spacing between the rollers 28.

The moisture of the material is measured by a moisture sensor, which in the example depicted is based on a microwave transmitter 32 and a microwave receiver 30. The moisture sensor operates by transmission, that is, the material is irradiated, and it is positioned in the discharge spout 26. More specific details concerning the construction and function of the moisture sensor are published in DE 196 48 126 A, the theory of which is incorporated by reference into the present application.

The moisture sensor is connected to the control device 44 by wiring. The control unit 44 electromagnetically controls a valve 40, which is connected to a sump 42 and a hydraulic cylinder 38 by hydraulic lines with a source P of pressurized hydraulic fluid. The ram of the hydraulic cylinder 38 is mechanically attached to a rocker arm 34, while its housing is supported by the chassis 12, of the harvester 10. The rocker arm 34 can be pivoted at one end about a rotational axis 48 located on the chassis 12 of the harvester 10. On the other end of the rocker arm 34, the upper roller 28 is positioned. The lower roller 28 of the kernel processor is, on the other hand, located in a fixed position. The upper roller 28 can be brought closer to the lower roller 28 by pressurization of the hydraulic cylinder 38. The ram of the hydraulic cylinder 38 works against the force of a spring 36 connected to the rocker arm 34. If the hydraulic cylinder 38 is separated from the source P, the spring 36 pulls the rocker arm 34 up, thereby pulling up the upper roller 28, so that the spacing between the rollers 28 is increased. The hydraulic fluid which then flows out of the hydraulic cylinder 38 is conveyed across the valve 40 to the sump 42. The upper roller 28 is attached at its other end to a second rocker arm corresponding to that shown in FIG. 2. The second rocker arm is preferably pivoted by a hydraulic cylinder attached to it.

In order to make it possible for the rollers 28 to yield in case a foreign object Id pass between them, the housing of the hydraulic cylinder 38 can be supported over a corresponding spring on the chassis 12. It is also conceivable to cushion it hydraulically, that is to connect the ram pressure compartment to a corresponding pressure accumulator.

The rocker arm 34 is also connected to a position sensor 46 in the form of a potentiometer adjusted by the rocker arm 34, which provides an output signal that contains data about the current position of the rocker arm 34. The position sensor 46 could also be installed inside the housing of the hydraulic cylinder 38. The output signal of the position sensor 46 is transmitted to the control device. It makes it possible for the control device 44 to adjust the valve 40 in such a way that the upper roller 28 is moved into its required position. The control device 44 is adjusted as a result of the adjustment of the position of the upper roller 28 and consequently the size of the opening between the rollers 28.

The control device 44 controls the size of the opening between the rollers 28, as described above, as a function of the moisture of the harvested material as measured by the moisture sensor. In addition, a relationship is stored in memory in the control unit between the moisture and the spacing between the rollers 28, for example in the form of a table, a database, or as a mathematical function. In special circumstances, the automatic control of the spacing between the rollers 28 can be switched off by an operator in the cab and be substituted by a manual adjustment of the size of the opening.

It is to be noted that various modifications of the invention are conceivable. For example, it would be conceivable to use another preferred moisture sensor instead of the microwave sensor, for example, a capacitive sensor, an optical sensor, or a conductivity sensor. The moisture sensor can also be installed in a location on the harvester 10 between the chopper drum 22 and the live ring of the discharge spout 26 or upstream of the chopper drum 22.

Instead of a pivoting rocker arm 34, the upper roller 28 can also be attached to a displaceable device, as described in DE 195 39 143 A. It would also be possible to move the lower and not the upper roller, or to move both rollers.

It would also be possible to use a different hydraulic control for the movable roller 28. For example, the control of the feed rollers described in DE 195 39 143 A, the theory of which is incorporated by reference into this application, which makes a selectable pressure possible, can be adapted to the rollers 28 of the kernel processor. In this instance, it would not be the spacing of the rollers 28 that is adjusted, but rather the contact pressure of one roller 28 on the other roller 28 would be adjusted by the control device 44 as a function of the moisture of the harvested material.

Having described the preferred embodiment, it will become apparent that various modifications can be made without departing from the scope of the invention as defined in the accompanying claims.

What is claimed is:

1. In a kernel processor including a pair of processor rollers between which chopped harvested plant material is passed, and with one of the processor rollers being adjustable toward and away from the other so as to alter a spacing between them, the improvement comprising: a powered device coupled to said one processor roller; a control device coupled to said powered device and being responsive to a control signal for controlling said powered device for effecting movement of said one processor roller; and a sensor coupled to said control device and being mounted for sensing a plant characteristic of the harvested material and issuing said control signal which corresponds to said sensed plant characteristic, whereby said powered device is controlled in accordance with said sensed plant characteristic.

2. The kernel processor defined in claim 1 wherein said sensor is a moisture sensor, which determines the moisture content of the harvested material, whereby said powered device is controlled in accordance with the moisture content of the harvested material.

3. The kernel processor defined in claim 2 wherein said sensor and control device respond to the moisture content of the harvested material in such a way that the powered device is caused to adjust said spacing between said processor rollers so that it is made increasingly smaller with increasing moisture content.

4. The kernel processor as defined in claim 2 wherein said sensor and control device respond to the moisture content of the harvested material in such a way that the powered device is caused to adjust a contact pressure between said processor rollers such that said contact pressure increases as said moisture content increases.

5. The kernel processor defined in claim 2 wherein a rocker arm is coupled to said powered device and to said one processor roller; a potentiometer coupled to said rocker arm for sensing its position at any one time so as to produce a spacing signal indicative of the spacing between said processor rollers; said spacing signal being coupled to said control device.

6. The kernel processor defined in claim 2 wherein said powered device is a one-way hydraulic cylinder; a rocker arm being coupled to said cylinder and said one processor roller; a spring being coupled to said rocker arm in opposition to said hydraulic cylinder and biasing said rocker arm to an extreme position in a range of positions disposing said one processor roller such that said spacing is at, and between, a minimum spacing and a maximum spacing.

\* \* \* \* \*